United States Patent
Huegerich (10) Patent No.: US 9,924,625 B2
(45) Date of Patent: Mar. 27, 2018

(54) JACK STAND FOR AUTO-CONNECT ASSEMBLY

(71) Applicant: Deere & Company, Moline, IL (US)

(72) Inventor: Tony J. Huegerich, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 572 days.

(21) Appl. No.: 14/521,049

(22) Filed: Oct. 22, 2014

(65) Prior Publication Data

US 2016/0113189 A1    Apr. 28, 2016

(51) Int. Cl.

| B60D 1/66 | (2006.01) |
|---|---|
| B60D 1/46 | (2006.01) |
| B60D 1/36 | (2006.01) |
| A01B 59/042 | (2006.01) |
| B60D 1/06 | (2006.01) |
| B60D 1/62 | (2006.01) |

(52) U.S. Cl.
CPC ............. *A01B 59/042* (2013.01); *B60D 1/06* (2013.01); *B60D 1/363* (2013.01); *B60D 1/465* (2013.01); *B60D 1/62* (2013.01); *B60D 1/66* (2013.01)

(58) Field of Classification Search
CPC ........ A01B 59/042; B60D 1/06; B60D 1/363; B60D 1/465; B60D 1/62; B60D 1/66
See application file for complete search history.

(56) References Cited

U.S. PATENT DOCUMENTS

| 2,429,761 A | 10/1947 | Ketel | |
|---|---|---|---|
| 2,844,390 A * | 7/1958 | Smith | B60D 1/26 |
| | | | 280/475 |
| 3,319,977 A * | 5/1967 | Quandt | B60D 1/06 |
| | | | 280/475 |
| 4,131,295 A | 12/1978 | Highberger | |

(Continued)

FOREIGN PATENT DOCUMENTS

| EP | 2676534 B1 | 12/2013 |
|---|---|---|
| FR | 2995756 A1 | 3/2014 |
| WO | 89/01418 A1 | 2/1989 |

OTHER PUBLICATIONS

European Search Report issued in counterpart application No. 15187201.7, dated May 10, 2016 (7 pages).

(Continued)

*Primary Examiner* — Joseph M Rocca
*Assistant Examiner* — Daniel S Yeagley (57) ABSTRACT

A coupling assembly couples an implement to a vehicle having a pickup hitch. The coupling assembly includes a coupler frame attached to the implement. A jack stand member is mounted on two coupling pins which project from the coupler frame. The jack stand member has a first slot which receives the first pin and a second slot which receives the second pin. The second slot forms a first shoulder which engages the second pin to support the coupler frame when the jack stand member is in a ground engaging lowered position. A block mounted to the pickup hitch is spaced apart from the jack stand member to allow it to fall to the lowered position when the coupler frame is uncoupled from the vehicle. The block engages a surface of the jack stand member to raise the jack stand member when the coupler frame is moved towards the vehicle.

14 Claims, 11 Drawing Sheets

(56) References Cited

U.S. PATENT DOCUMENTS

| | | | |
|---|---|---|---|
| 4,182,426 A * | 1/1980 | Balzer | B60S 9/10 |
| | | | 180/12 |
| 4,346,911 A * | 8/1982 | Wiese | A01B 59/042 |
| | | | 280/474 |
| 4,368,899 A | 1/1983 | Smalley et al. | |
| 4,738,463 A | 4/1988 | Poore et al. | |
| 4,763,743 A | 8/1988 | Ridgway | |
| 5,692,573 A * | 12/1997 | Zahn | A01B 59/042 |
| | | | 172/439 |
| 6,062,321 A | 5/2000 | Defrancq | |
| 7,290,977 B2 | 11/2007 | Albright et al. | |
| 7,717,189 B2 | 5/2010 | Shoup | |
| 8,770,612 B2 | 7/2014 | Wendte et al. | |
| 2012/0068438 A1 | 3/2012 | Kollath | |
| 2013/0133905 A1 | 5/2013 | Valet | |
| 2013/0277943 A1 | 10/2013 | Wendte et al. | |

OTHER PUBLICATIONS

GDS GmbH, GANGL Docking System, product description web page, retrieved Oct. 8, 2014 from http://www.ganglsystems.com/en/product/.

* cited by examiner

JACK STAND FOR AUTO-CONNECT ASSEMBLY

FIELD

The present disclosure relates to a tractor-implement auto-connect assembly with a jack stand.

BACKGROUND

A tractor or utility vehicle used for agricultural work may be coupled to an implement which has electrical couplers, hydraulic couplers and/or a PTO which must be connected to the tractor couplers and to the tractor PTO. Implements are not utilized full time with a tractor, so it is desirable that a coupling mechanism allow quick, easy connecting and disconnecting of the implement. With a manually operated implement coupling assembly, the implement coupler is normally supported at a desired height by a jack stand which set and removed manually. It is desired to provide a tractor/implement coupler mechanism with a jack stand which can be automatically set and removed without the operator having to leave the tractor cab.

SUMMARY

According to an aspect of the present disclosure, a coupling assembly is provided for coupling an implement to a vehicle having a pickup hitch. The pickup hitch includes a drawbar housing which is pivotal about a horizontal axis and a drawbar slidable in the drawbar housing. The coupling assembly includes a coupler frame adapted to be attached to the implement, a jack stand member movably mounted on the coupler frame, and a block mounted to the pickup hitch.

According to another aspect of the present disclosure, the block engages a first surface of the jack stand member to raise the jack stand member from a ground engaging lowered position when the coupler frame is moved towards the vehicle. The block is spaced apart from the jack stand member to allow the jack stand member to fall to its lowered position when the coupler frame is moved away from the vehicle into an uncoupled position. The jack stand member in its lowered position releasably supports the coupler frame in a raised position above the ground.

According to another aspect of the present disclosure, first and second coupler pins project from a side of the coupler frame. The first pin is spaced apart forwardly from the second pin. The jack stand member has a first slot which slidably and rotatably receives the first pin, and a second slot which slidably receives the second pin. The jack stand member is pivotal about the first pin. The second slot forms a first shoulder which is engagable with the second pin to releasably hold the coupler frame raised above the ground. The second slot forms a second shoulder which is engagable with the second pin when the jack stand member is in a raised position.

According to another aspect of the present disclosure, the first slot portion is curved about a center of curvature which positioned forwardly of the first slot portion. The second slot portion extends upwardly and rearwardly from an upper end of the first slot portion. The third slot portion extends downwardly and rearwardly from an upper end of the second slot portion when the jack stand member is in its raised position. The first slot extends generally towards and away from the second slot.

According to another aspect of the present disclosure, the block engages a second surface of the jack stand member to support the jack stand member in a raised position when the coupler frame is in a coupled position. The first surface faces towards the vehicle, and the second surface faces towards the ground.

According to another aspect of the present disclosure, the coupling assembly includes a left jack member mounted to a left side of the coupler frame and a right jack member mounted to a right side of the coupler frame. The first surface faces forwardly and is engagable with a rearwardly facing block surface formed on the block.

According to another aspect of the present disclosure, the jack stand member comprises a base plate and a side plate which is joined to an edge of the base plate. The first and second slots are formed in the side plate.

DETAILED DESCRIPTION OF THE DRAWINGS

Figure 1:
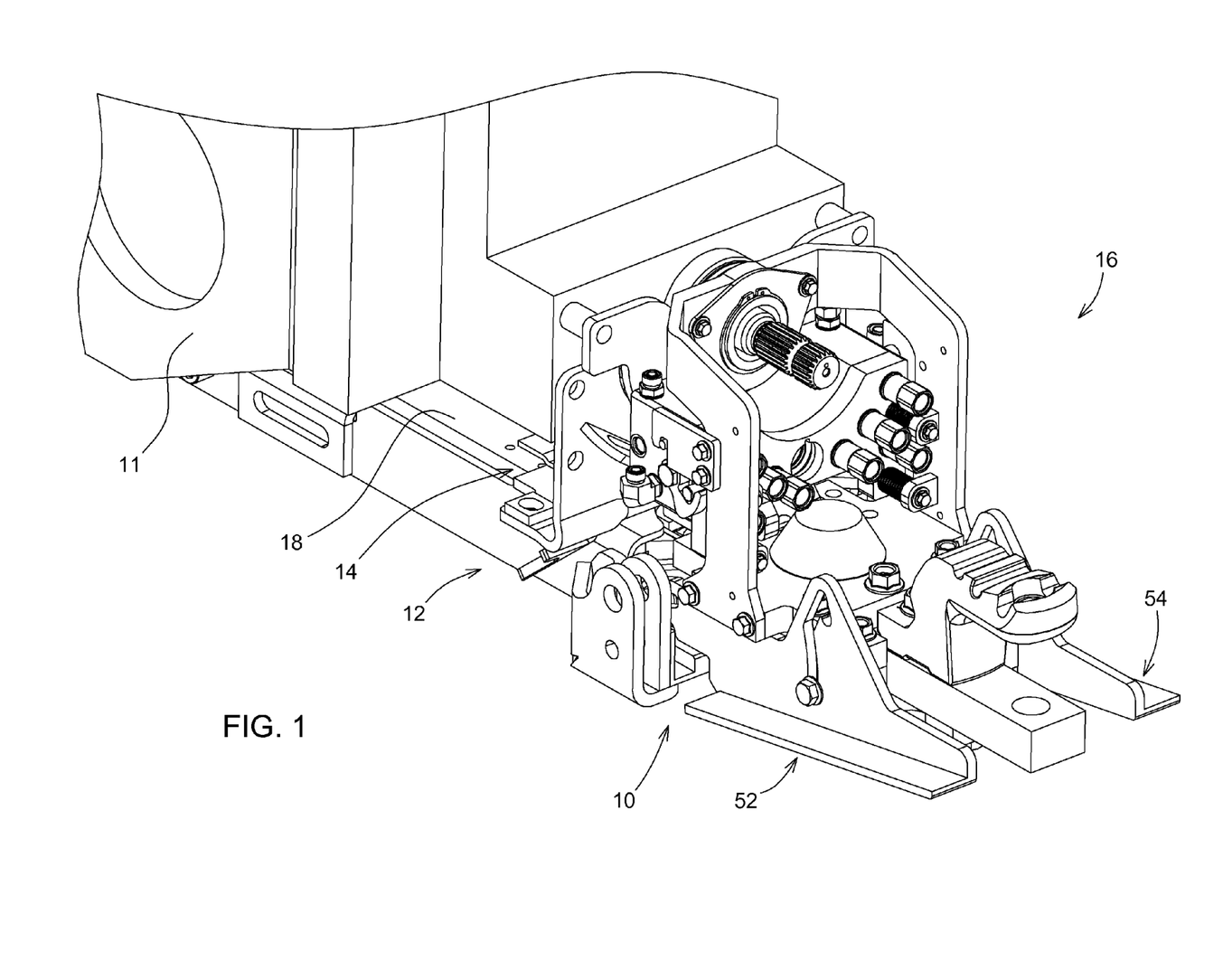
FIG. 1 is a perspective view of a tractor-implement connection assembly embodying the invention.
Figure 2:
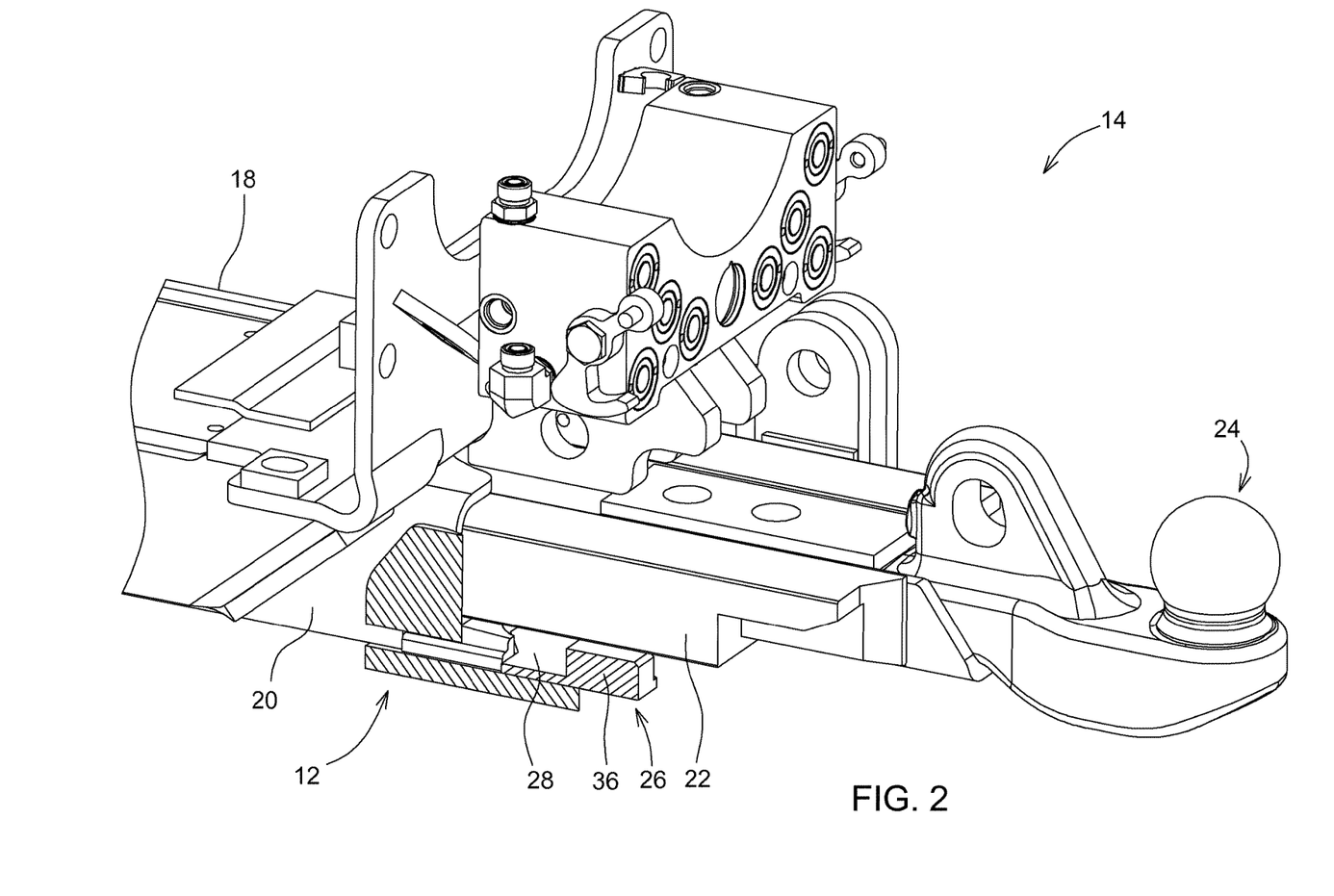
FIG. 2 is a perspective view of the tractor coupler of FIG. 1.
Figure 3:
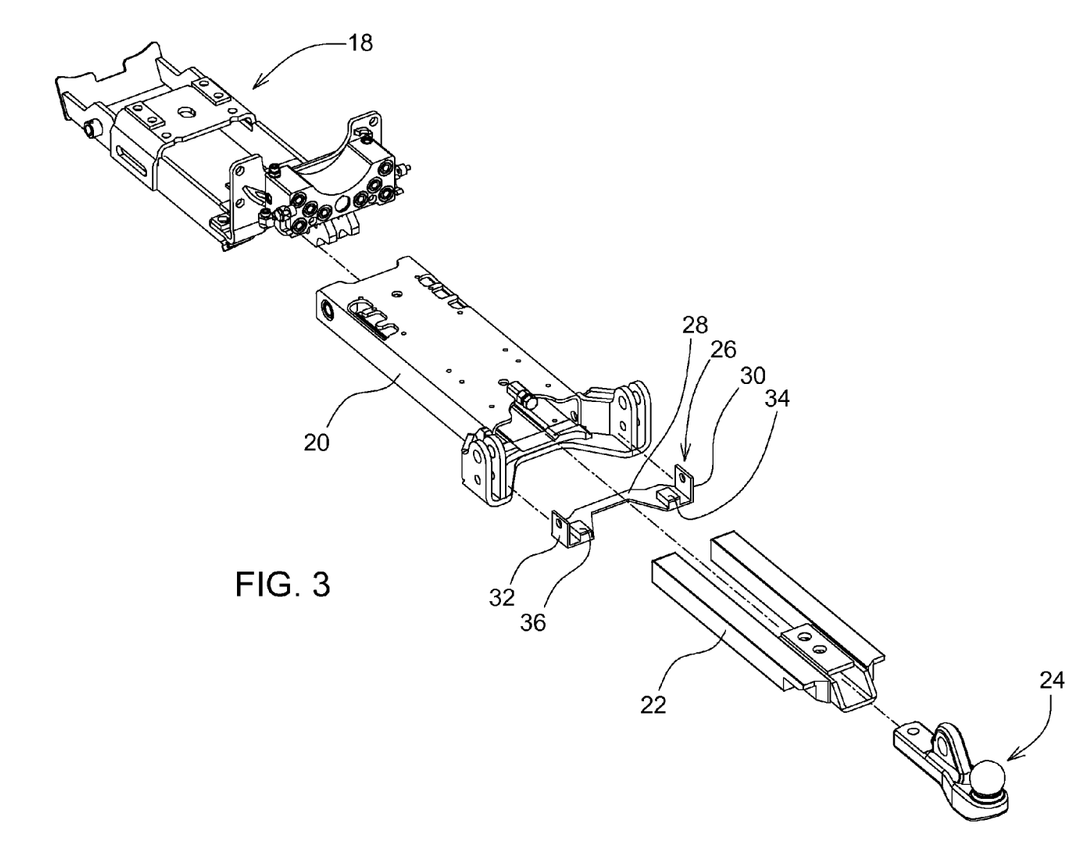
FIG. 3 is a perspective exploded view of the tractor coupler of FIG. 2.

Referring to FIGS. 1, 2 and 3, a coupling assembly 10 couples an implement to a vehicle which has a pick up hitch 12. The pick up hitch 12 is mounted to a rear vehicle housing 11. The coupling assembly 10 includes a tractor coupler 14 and an implement coupler 16. The tractor coupler 14 is mounted on the hollow outer housing 18 of the pick up hitch 12. The pick up hitch 12 has a hollow inner housing 20 which is pivotally coupled to a front portion of the outer housing 18 about a transverse horizontal axis. A drawbar 22 is slidable in the inner housing 20 and a cylinder (not shown) extends and retracts the drawbar 22. The drawbar 22 supports a hitch ball 24. A stop member 26 is mounted to the rear end of inner housing 20. The stop member 26 has a base 28, left and right side plates 30 and 32, and left and right block-shaped stop blocks 34 and 36. The stop blocks 34 and 36 are placed on the upper surface of the base 28, each adjacent a corresponding one of the left and right side plates 30, 32.

Figure 4:
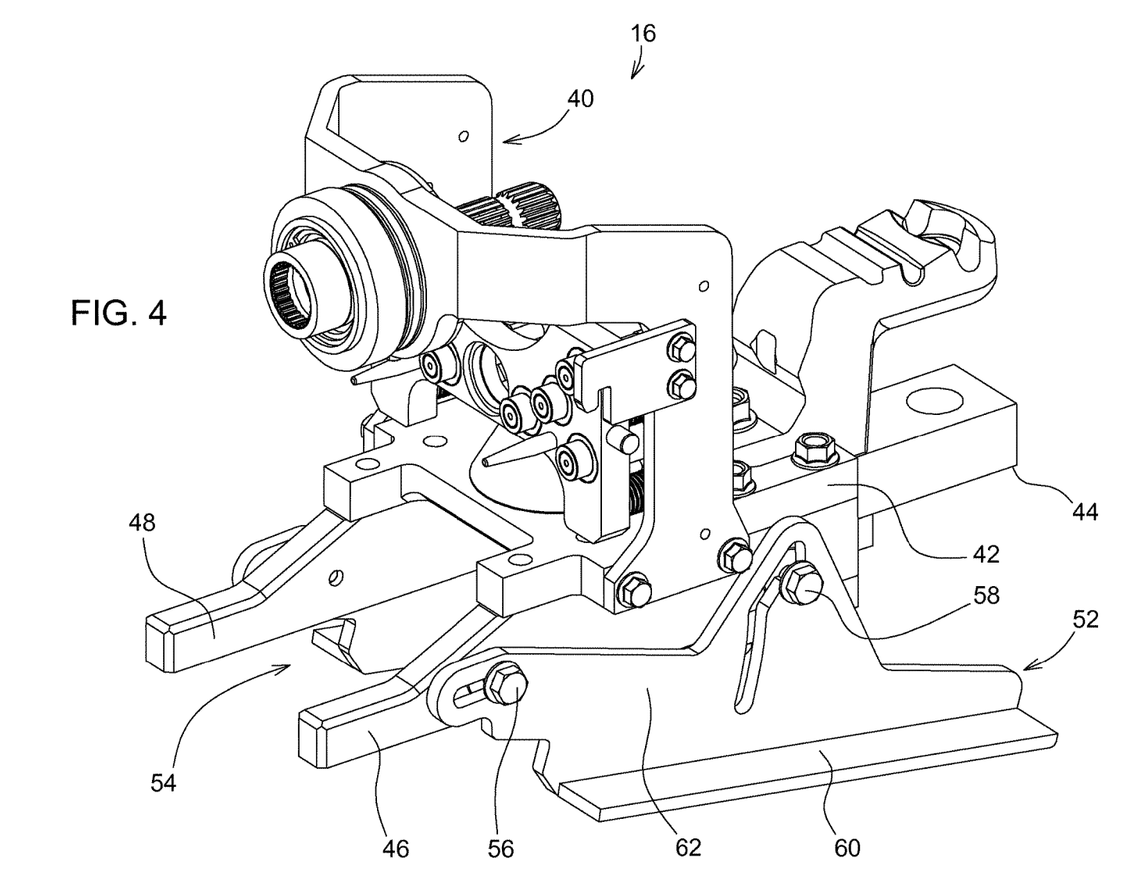
FIG. 4 is a perspective view of the implement coupler of FIG. 1.
Figure 5:
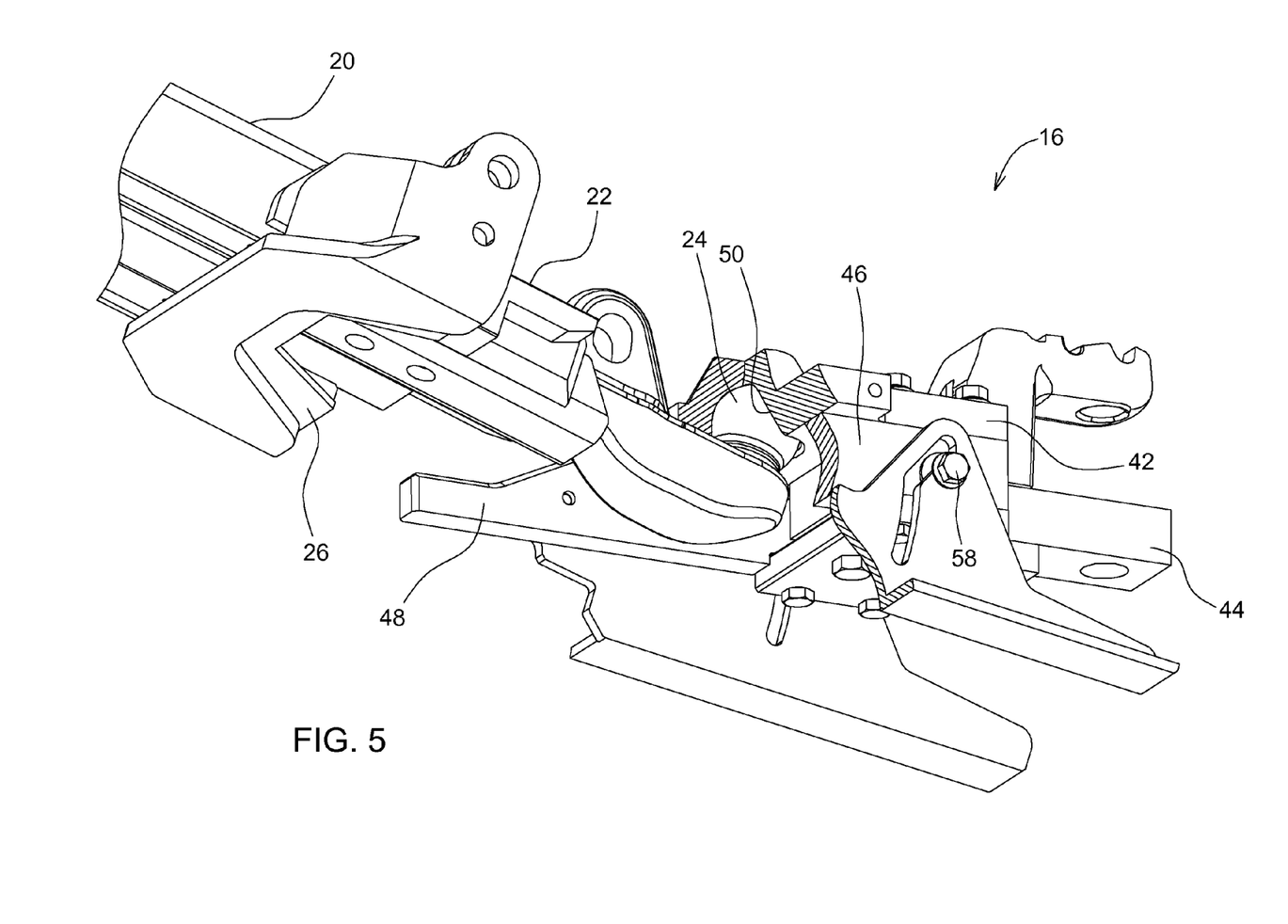
FIG. 5 is a bottom perspective view of a portion of the tractor-implement connection assembly of FIG. 1 with components and parts of components removed for clarity.

Referring to FIGS. 4 and 5, the implement coupler 16 includes a coupler frame 40 which is attached to a base 42.

The base 42 is attached to an implement tongue 44. Spaced apart left and right side members 46 and 48 are attached to the underside of the base 42. As best seen in FIG. 5, the base 42 forms a downwardly opening socket 50 which releasably receives the hitch ball 24. As a result, the drawbar 22 is operable to pull the implement coupler 16 towards the tractor coupler 14. As best seen in FIG. 4, a left jack stand member 52 is movably attached to the left side of the left side member 46, and a right jack stand member 54 is movably attached to the right side of the right side member 48.

The following description pertains to the left jack stand member 52 and its supporting bolts or pins. The corresponding right side structure, including right jack stand member 54, is not described further since it is a mirror image of the left side structure. A first or front support bolt 56 projects from a front portion of the left side of the left side member 46. A second or rear support bolt 58 projects from a rear portion of the left side of the left side member 46. The first bolt 56 is spaced apart forwardly from the second bolt 58.

Figure 6:
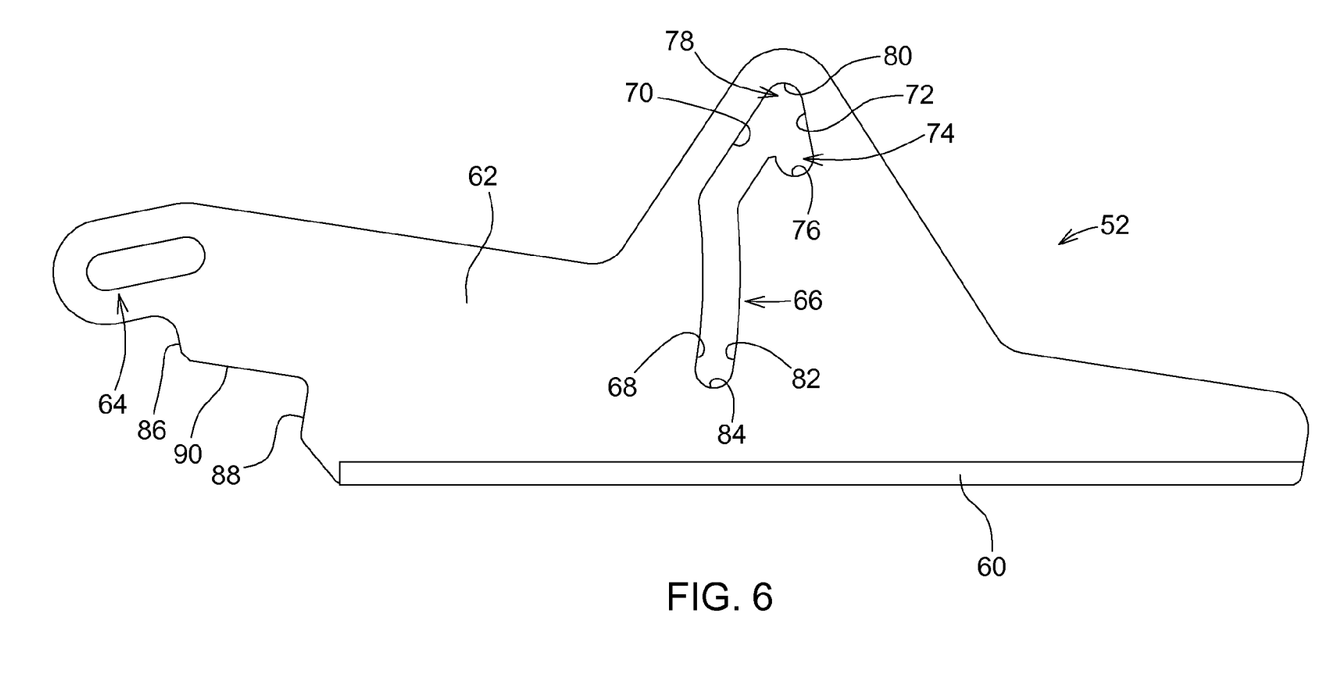
FIG. 6 is a side view of the jack stand member of FIG. 4.
Figure 7:
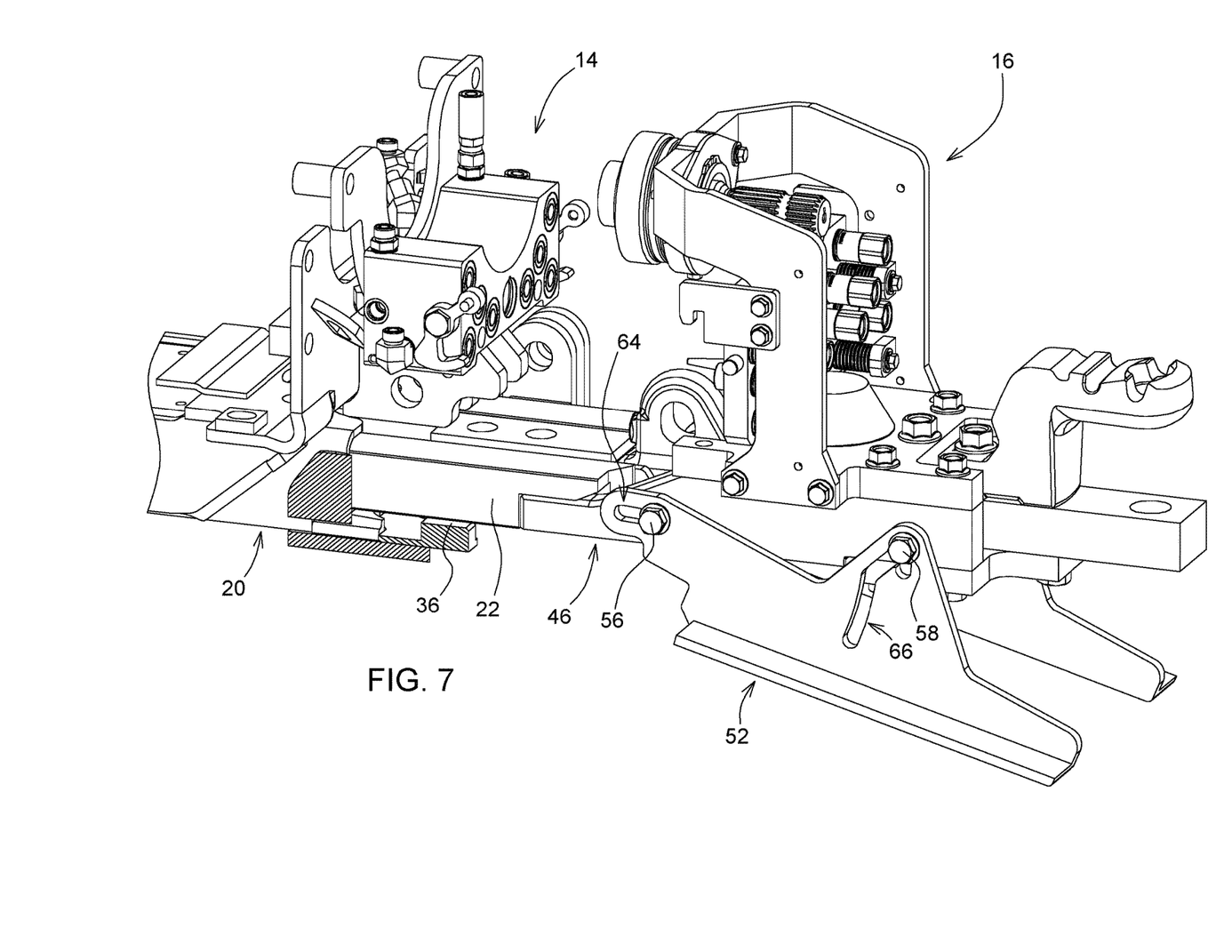
FIG. 7 is a perspective view of the tractor-implement connection assembly of FIG. 1, with the jack stand member in a lowered position.

Referring to FIGS. 4, 6 and 7, the left jack stand member 52 is mounted on the support bolts 56 and 58. The left jack stand member 52 includes a base 60 and a plate 62 which projects vertically upwardly from and edge of the base 60. The plate 62 includes a first or forward slot 64 and a second or rear slot 66. First slot 64 slidably and rotatably receives the first bolt 56 and the second slot 66 slidably and rotatably receives the second bolt 58. The first slot 64 is elongated in a generally fore-and-aft direction. The second slot 66 includes a first portion 68, a second portion 70 and a third portion 72. The second portion 70 joins the first portion 68 to the third portion 72. A lower end 74 of the third portion forms a first shoulder 76 which is engagable with the second bolt 58 to releasably hold the jack stand member 52 in a lowered position (see FIG. 7) with respect to the implement coupler 16, and to hold the implement coupler 16 above the ground when it is not being supported by the pick up hitch 12, as best seen in FIG. 4. An upper end 78 of the third slot portion 72 forms a second shoulder 80 which is engagable with the second bolt 58 when the jack stand member 52 is supported by the second bolt 58. A lower end 82 of the first slot portion 68 forms a third shoulder 84 which is engagable with the second bolt 58 when the jack stand member 52 is in a fully raised position (see FIG. 10).

The first slot portion 68 extends generally upwardly away from a lower end 82 and away from the base 60. The first portion 68 is curved and is concave in a direction towards the first slot 64. The first portion 68 has a radius of curvature which is centered about the first bolt 56 when the first bolt 56 is positioned at the front end of first slot 64 (see FIG. 10) The second slot portion 70 extends linearly upwardly and rearwardly away from the upper end of the first slot portion 68. The third slot portion 72 extends generally downwardly and slightly rearwardly from the upper end of the second slot portion 70. The third slot portion 72 is shaped and positioned so that the third slot portion 72 can slide with respect to the second bolt 58 and so that left jack stand member 52 can rotate (counter clockwise viewing FIG. 4) about the first support bolt 56 when the bolt 56 is at the rear end of the first slot 64.

Referring to FIG. 6, the left jack stand member 52 forms a first forward facing shoulder 86 and a second forward facing shoulder 88 separated and joined together by a downward facing edge 90.

Referring now to FIG. 7, before the coupler frame 40 is moved towards the tractor coupler 14, the block 36 is spaced apart from the jack stand member 52, and the jack stand member 52 is in its lowered position.

Figure 8:
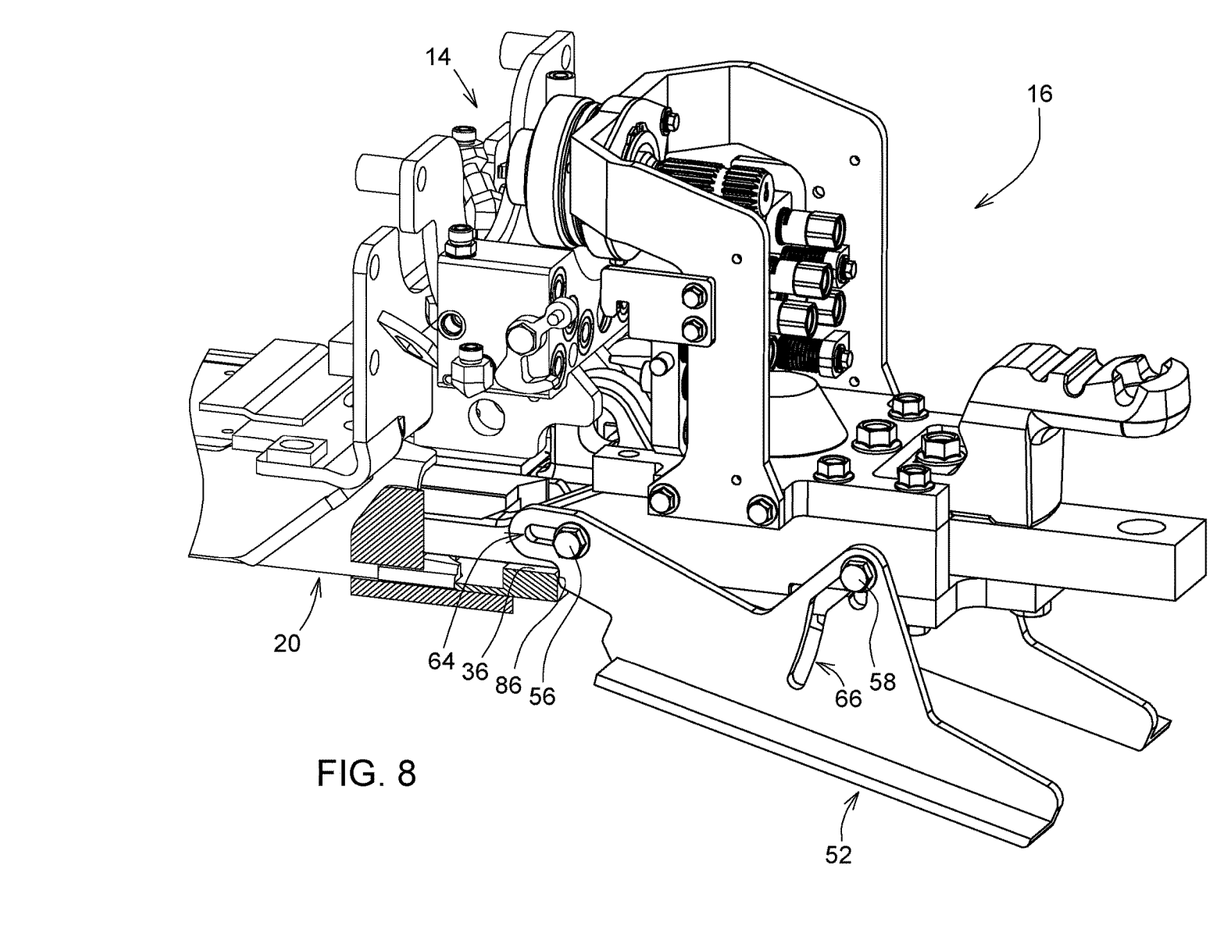
FIG. 8 is a perspective view of the tractor-implement connection assembly of FIG. 1, with the jack stand member beginning to be raised from its lowered position.
Figure 9:
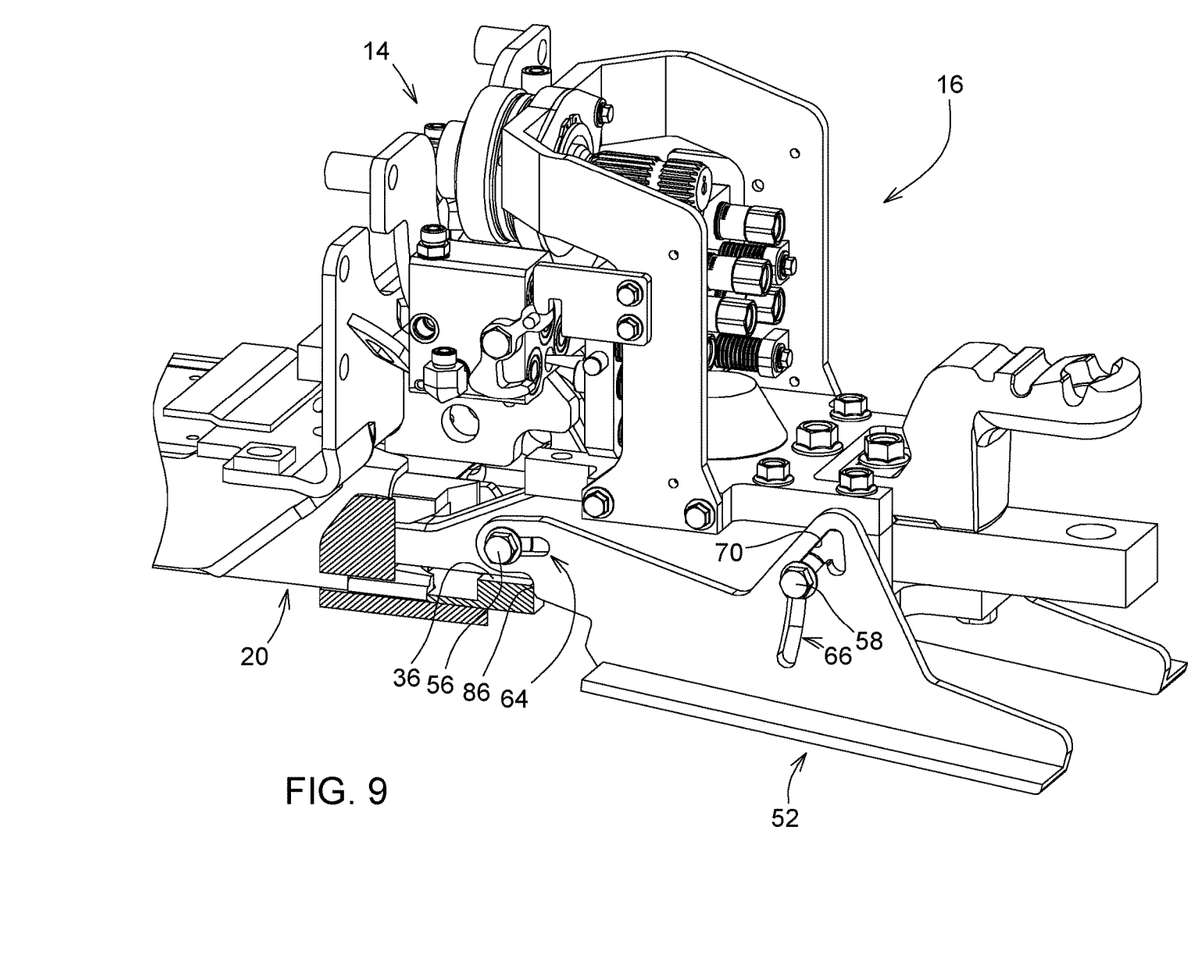
FIG. 9 is a perspective view of the tractor-implement connection assembly of FIG. 1, with the jack stand member in a further raised position.
Figure 10:
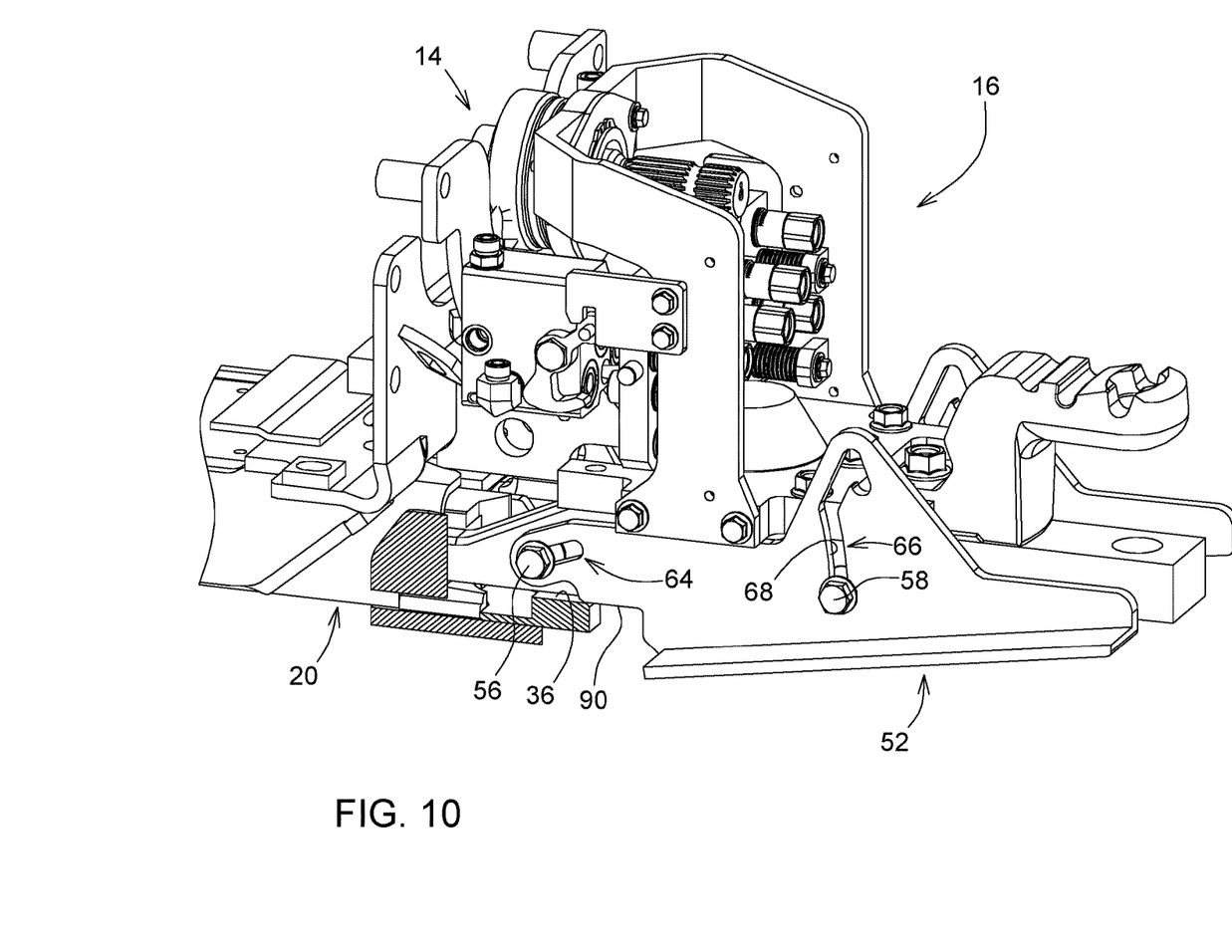
FIG. 10 is a perspective view of the tractor-implement connection assembly of FIG. 1, with the jack stand member in a fully raised position.
Figure 11:
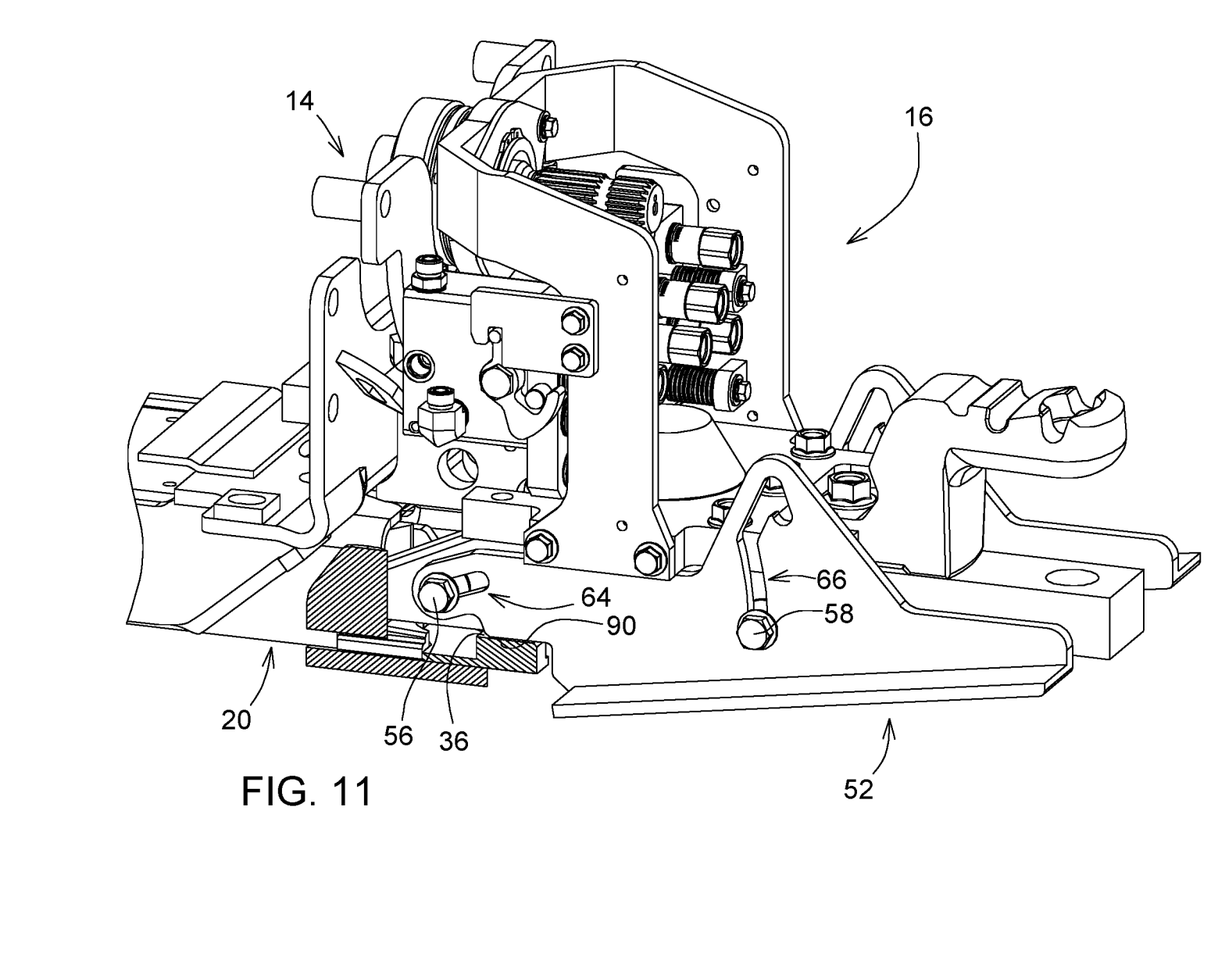
FIG. 11 is a perspective view of the tractor-implement connection assembly of FIG. 1, with the jack stand member in a secured fully raised position.

Referring now to FIG. 8, as the implement coupler 16 is pulled towards the tractor coupler 14, the block 36 engages first shoulder 86 and pivots the jack stand member 52 upwardly about first bolt 56. Referring now to FIG. 9, as the implement coupler 16 is pulled further towards the tractor coupler 14, the block 36 engages first shoulder 86 and shifts the jack stand member 52 rearward with respect to first bolt 56 and the rear portion of jack stand member 52 moves upwardly so that the second bolt 58 is at the bottom end of second slot portion 70. Referring now to FIG. 10, as the implement coupler 16 is pulled further towards the tractor coupler 14, the jack stand member 52 is moved to its fully raised position wherein second bolt 58 engages the third shoulder 84 at the bottom of first slot portion 68, and the block 36 begins to engage the edge 90 of the jack stand member 52. Referring now to FIG. 11, as the implement coupler 16 is pulled further towards the tractor coupler 14, the jack stand member 52 remains in its fully raised position, and the block 36 more fully engages the edge 90 to hold the jack stand member 52 in its fully raised position.

The result is a jack stand mechanism which can be used with a tractor-implement auto-connect assembly which allows an operator to connect a tractor to an implement without leaving the cab. The jack stands support the implement and allow the ball of a pick up hitch to connect to the implement coupler. When the pick up hitch pulls the socket to the tractor, the jack stands contact a block on the pick up hitch frame that pushes the jack stands back and up to maintain tractor ground clearance. The jack stands have machined slots that ride on shoulder bolts on the implement coupler assembly. When the implement coupler is pushed away from the tractor, the jack stands drop down from their own weight. When the pick up hitch drops the implement coupler to the ground the jack stands are locked in a notch at the end of the groove to support the implement.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A coupling assembly for coupling an implement to a vehicle having a pickup hitch, the pickup hitch having a drawbar housing which is pivotal about a horizontal axis and a drawbar slidable in the drawbar housing, the coupling assembly comprising:
   a coupler frame adapted to be attached to the implement;
   a jack stand member movably mounted on the coupler frame; and
   a block mounted to the pickup hitch, the block engaging a first surface of the jack stand member to raise the jack stand member from a ground engaging lowered position when the coupler frame is moved towards the vehicle, the block being spaced apart from the jack stand member to allow the jack stand member to fall to the lowered position when the coupler frame is moved away from the vehicle into an uncoupled position, the jack stand member in the lowered position releasably supporting the coupler frame in a raised position above the ground, the block engaging a second surface of the jack stand member to support the jack stand member in a raised position when the coupler frame is in a coupled position.

2. The coupling assembly of claim 1, further comprising a first coupler pin and a second coupler pin, the jack stand member having a first slot which slidably and rotatably receives the first coupler pin and a second slot which slidably receives the second coupler pin, and the jack stand member being pivotal about the first coupler pin.

3. The coupling assembly of claim 2, wherein:
a first slot portion of the second slot is curved about a center of curvature, wherein the center of curvature is positioned forwardly of the first slot portion.

4. The coupling assembly of claim 3, wherein:
a second slot portion of the second slot extends upwardly and rearwardly from an upper end of the first slot portion.

5. The coupling assembly of claim 4, wherein:
a third slot portion of the second slot extends downwardly and rearwardly from an upper end of the second slot portion when the jack stand member is in the raised position.

6. The coupling assembly of claim 2, wherein:
the first slot extends generally towards and away from the second slot.

7. The coupling assembly of claim 2, wherein:
the second slot forms a first shoulder which is engagable with the second pin to releasably hold the coupler frame raised above the ground.

8. The coupling assembly of claim 7, wherein:
the second slot forms a second shoulder which is engagable with the second pin when the jack stand member is in a raised position.

9. The coupling assembly of claim 1, wherein:
the jack stand member comprises a base plate and a side plate which is joined to an edge of the base plate, the first and second slots being formed in the side plate.

10. The coupling assembly of claim 1, wherein:
the first surface faces towards the vehicle; and
the second surface faces towards the ground.

11. The coupling assembly of claim 1, wherein:
the jack stand member comprises a left jack member mounted to a left side of the coupler frame and a right jack member mounted to a right side of the coupler frame.

12. The coupling assembly of claim 1, wherein:
the jack stand member comprises a base plate and a side plate which is joined to an edge of the base plate.

13. The coupling assembly of claim 1, wherein:
the first surface faces forwardly and is engagable with a rearwardly facing block surface formed on the block.

14. A coupling assembly for coupling an implement to a vehicle having a pickup hitch, the coupling assembly comprising:
a coupler frame adapted to be attached to the implement;
first coupler pin and a second coupler pin;
a jack stand member mounted on the coupler pins, the jack stand member having a first slot which slidably and rotatably receives the first pin and a second slot which slidably receives the second pin, the jack stand member being pivotal about the first pin, an end of the second slot forming a first shoulder which is engagable with the second pin to releasably support the coupler frame when the jack stand member is in a ground engaging lowered position with respect to the coupler frame; and
a block mounted to the pickup hitch, the block being spaced apart from the jack stand member to allow the jack stand member to fall to the lowered position when the coupler frame is moved away from the vehicle into an uncoupled position, the block engaging a first surface of the jack stand member to raise the jack stand member from the lowered position when the coupler frame is moved towards the vehicle, the block engaging a second surface of the jack stand member to support the jack stand member in a raised position when the coupler frame is in a coupled position.

* * * * *